United States Patent
Pannem et al.

(10) Patent No.: US 10,592,384 B2
(45) Date of Patent: Mar. 17, 2020

(54) COSTING OF RAW-DEVICE MAPPING (RDM) DISKS

(71) Applicant: VMware, Inc., Palo Alto, CA (US)

(72) Inventors: Hemanth Kumar Pannem, Cupertino, CA (US); Vipin Balachandran, Cupertino, CA (US); Prashant Waykar, San Jose, CA (US); Shruti Parihar, Los Altos, CA (US)

(73) Assignee: VMWARE, INC., Palo Alto, CA (US)

( * ) Notice: Subject to any disclaimer, the term of this patent is extended or adjusted under 35 U.S.C. 154(b) by 113 days.

(21) Appl. No.: 16/013,137

(22) Filed: Jun. 20, 2018

(65) Prior Publication Data

US 2019/0391900 A1  Dec. 26, 2019

(51) Int. Cl.
  *G06F 12/00* (2006.01)
  *G06F 11/34* (2006.01)
  *G06F 11/30* (2006.01)
  *G06F 3/06* (2006.01)

(52) U.S. Cl.
  CPC ........ *G06F 11/3495* (2013.01); *G06F 3/0604* (2013.01); *G06F 3/067* (2013.01); *G06F 3/0653* (2013.01); *G06F 11/301* (2013.01); *G06F 11/3034* (2013.01)

(58) Field of Classification Search
  None
  See application file for complete search history.

(56) References Cited

U.S. PATENT DOCUMENTS

| 2012/0260248 A1* | 10/2012 | Katiyar | G06F 9/45533 718/1 |
| 2013/0262801 A1* | 10/2013 | Sancheti | G06F 3/065 711/162 |
| 2015/0242226 A1* | 8/2015 | Palavalli | G06F 9/45533 718/1 |
| 2017/0123852 A1* | 5/2017 | Chagalakondu | G06F 9/45558 |
| 2018/0165698 A1* | 6/2018 | Chandrashekar | G06Q 30/0206 |

* cited by examiner

*Primary Examiner* — Daniel D Tsui
(74) *Attorney, Agent, or Firm* — Thomas Horstemeyer, LLP

(57) ABSTRACT

Disclosed are various embodiments for costing Raw-Device Mapping (RDM) disks. A pseudo-datastore is created. The pseudo-datastore represents the RDM disk. The RDM disk includes a mapping file that exposes direct access to a disk identified by a logical unit number (LUN). A unit rate is assigned to the pseudo-datastore, the unit rate representing a cost per unit of storage provided by the RDM disk. Usage of the RDM disk is monitored. A cost is calculated for the usage of the RDM disk for a period of time based on the unit rate assigned to the pseudo-datastore.

20 Claims, 3 Drawing Sheets

COSTING OF RAW-DEVICE MAPPING (RDM) DISKS

BACKGROUND

The cost that a hosting provider charges a customer for the usage of an instance of a virtual machine provided by the hosting provider is often determined by a number of variables. For example, the amount or storage space assigned to the virtual machine, the amount or random access memory (RAM) assigned to the virtual machine, as well as the number of physical or virtual processors assigned to the virtual machine may all impact the cost charged by the hosting provider. Moreover, each of these resources may have different tiers of performance with different associated costs. For example, a virtual machine may have the option of having one or more virtual disks stored on an array of high-bandwidth, low-latency solid state drives (SSDs) or high-capacity, but lower bandwidth and higher-latency hard disk drives (HDDs). The hosting provider may charge different rates for usage of SSDs or HDDs for storage of a virtual machine's virtual disks.

However, some types of resources consumed by virtual machines can be difficult to accurately track. For example, tracking the amount of storage used by virtual machines that have been assigned one or more Raw-Device Mapping (RDM) disks and charging appropriately for it faces several problems. First, the mapping file provided by the RDM to the virtual machine may reside in a different data store than the underlying logical device that stores the data. For instance, the mapping file may be located on an array of HDDs while the mapped data may be stored on an array of SSDs. Second, the different data stores may have different costs associated with their usage.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various embodiments for tracking, calculating, and assigning costs for usage of raw-device mapping (RDM) disks in a virtualized computing environment, such as by one or more virtual machines in a software-defined data center. RDM disks may be assigned to a virtual machine 100 in physical mode or virtual mode. Each of these modes provides for a set of capabilities and constraints which can affect the amount of storage used by a virtual machine, thereby impacting the cost associated with the virtual machine. In the following discussion, a general description of the system and its components is provided, followed by a discussion of the operation of the same.

Figure 1:
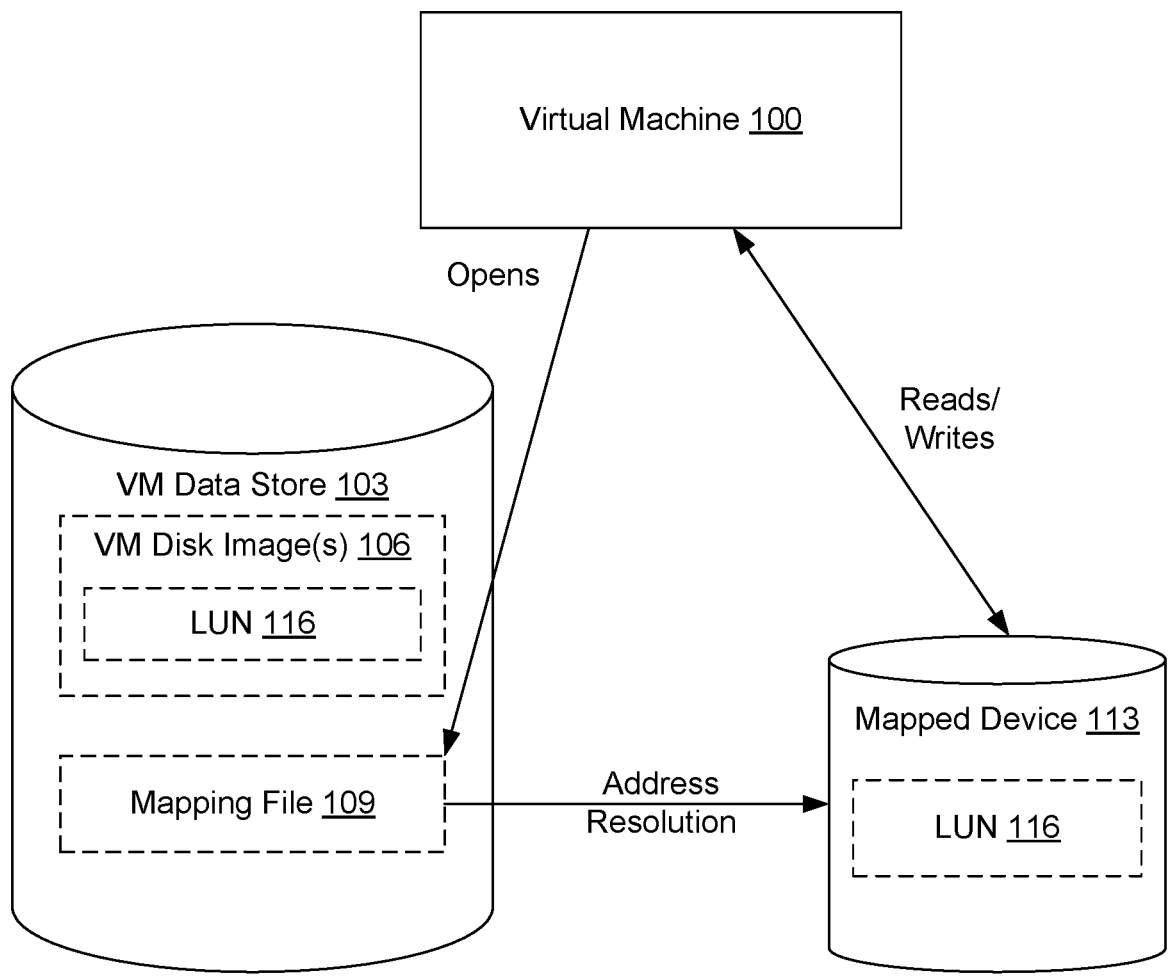
FIG. 1 is a drawing depicting the operation of an Virtual Machine that has been allocated an RDM disk.

FIG. 1 is a schematic diagram illustrating the operation of a virtual machine 100 that has been assigned an RDM disk. The virtual machine 100 can have access to a virtual machine data store 103, which provides storage for the virtual machine 100. The virtual machine data store 103 can include one or more virtual machine disk images 106. For an RDM disk, the virtual machine data store 103 can also include a mapping file 109.

The virtual machine data store 103 can be a filesystem on one or more disks attached to one or more host computing devices that is used to store virtual machine disk images 106. For example, the virtual machine data store 103 could be a clustered file system, a distributed file system, parallel file system, or similar schema for storing data on physical media. For example, the virtual machine data store 103 could be implemented using a version of VMWARE's Virtual Machine File System (VMFS).

The virtual machine disk image 106 can be a computer file representing the contents and structure of a disk volume or an entire data storage device, such as a hard disk drive, tape drive, floppy disk, optical disk, universal serial bus (USB) flash drive, or other storage device. The virtual machine disk image 106 may be copied at various points in time to create clones of the virtual machine disk image 106. In some implementations, multiple virtual machines 100 may mount the same virtual machine disk image 106. In these implementations, a single virtual machine 100 may initially mount the virtual machine disk image 106 with read and write privileges while other virtual machines 100 may mount the virtual machine disk image 106 with read-only privileges. This allows for the state of data stored in the virtual machine disk image 106 to remain consistent between virtual machines 100.

The mapping file 109 is used to provide a mechanism for a virtual machine 100 to have direct access to a mapped device 113 identified by a logical unit number (LUN) 116. This mechanism may be referred to as raw device mapping (RDM) because the mapped device 113 may be a physical disk on a storage subsystem to which direct access is provided for the virtual machine 100. The mapping file 109 provides a reference or symbolic link to the mapped device 113 identified by the LUN 116. The mapping file 109 is presented to the virtual machine 100 as an ordinary virtual machine disk image 106 available for typical file-system operations. However, the mapping file 109 contains address resolution that identify the location of the mapped device 113, the locking state of the mapped device 113, permissions for accessing the mapped device 113, and potentially other data. When the virtual machine 100 opens the mapping file 109, the address of the mapped device 113 is resolved and provided to the virtual machine 100. Subsequent data reads and writes using the mapping file 109 are performed using the mapped device 113 rather than the virtual machine data store 103.

The mapped device 113 can represent any logical disk drive identified by a LUN 116. The mapped device 113 can include a single physical disk drive addressable by the LUN 116, an array of disk drives configured as a redundant array of inexpensive disks (RAID) array, a clustered file system, a distributed file system, a storage array network (SAN), or other storage device or arrangement of storage devices. In some implementations, the mapped device 113 can be stored in the same storage system or medium as the mapping file 109. For example, the mapped device 113 and the mapping file 109 could be stored on the same SAN. In other implementations, the mapped device 113 and the mapping file 109 could be stored on different storage systems, devices, or media. For example, the mapping file 109 could be stored on a first storage array and the mapped device 113 could represent a separate storage array or physical disk.

The mapping file 109 can also specify the mode in which the virtual machine 100 accesses the mapped device 113. For example, the mapping file 109 could specify that the virtual machine 100 is able to access the mapped device in physical mode. When physical mode is enabled, all SCSI commands issued by the virtual machine 100 are passed by the hypervisor managing the virtual machine 100 to the mapped device 113 with the exception of the REPORT LUN command. While physical mode exposes all of the physical characteristics of the mapped device 113, certain functions of virtual machine disk images 106 such as snapshotting or cloning may be disabled. As another example, the mapping file 109 could specify that the virtual machine 100 is able to access the mapped device 113 in virtual mode. When virtual mode is enabled, the hypervisor managing the virtual machine 100 only passes READ and WRITE commands to the mapped device 113, thereby hiding the physical characteristics of the mapped device 113 and causing the mapped device 113 to appear to the virtual machine 100 as if it were a virtual machine disk image 106.

The logical unit number (LUN) 116 is a number used to identify a logical unit. A logical unit can be a device addressed by the small computer system interface (SCSI) protocol or SAN protocols that encapsulate SCSI, such as Fibre Channel or iSCSI. A LUN 116 may be used to identify any device which supports read/write operations. This can include a logical disk allocated on a SAN, a physical disk, or array of physical disks. A LUN 116 can further be used to identify a mapped device 113 or a virtual machine disk image 106.

Figure 2:
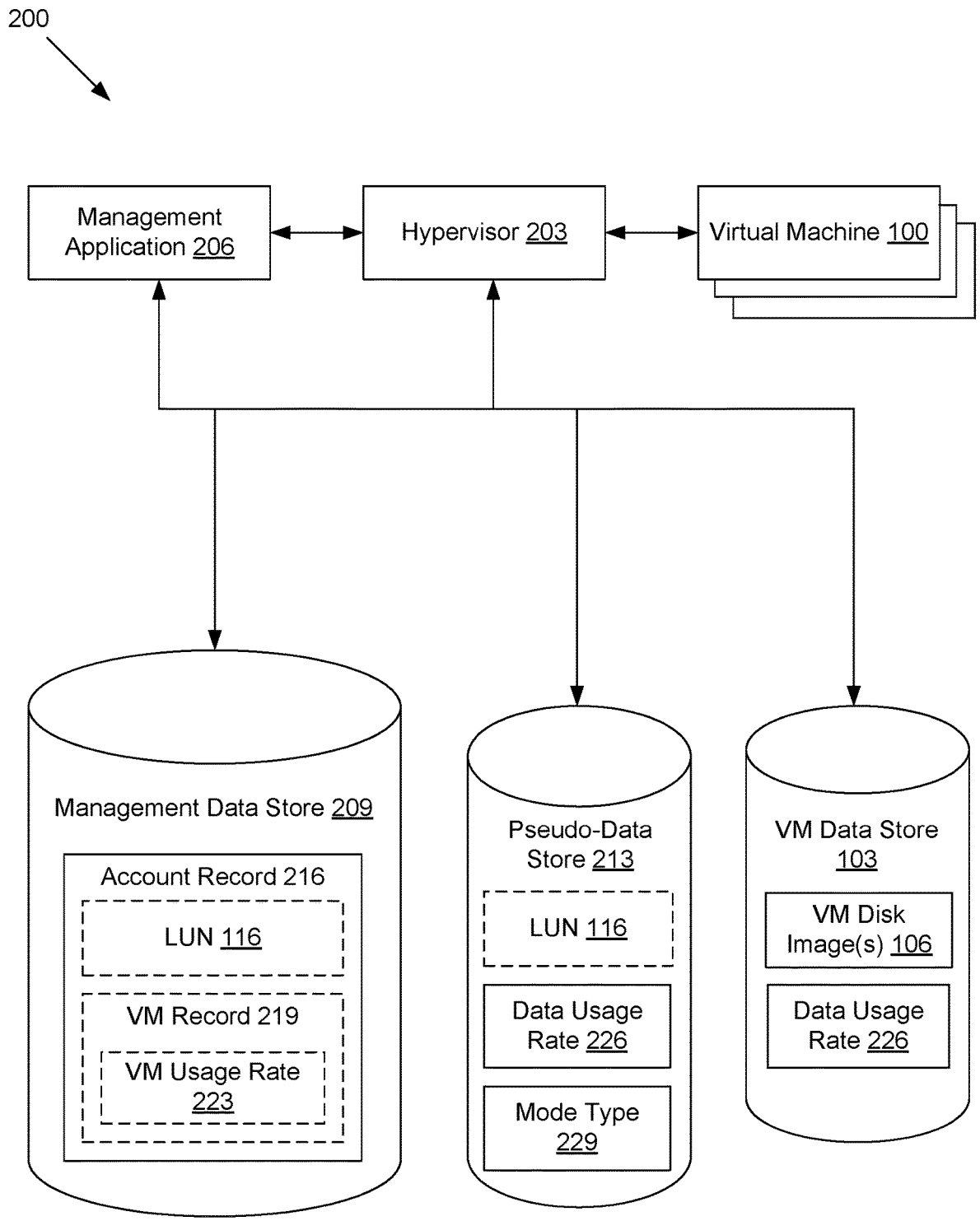
FIG. 2 is a drawing of a networked environment according to various embodiments of the present disclosure.

With reference to FIG. 2, shown is a computing environment 200 according to various embodiments. For example, the computing environment 200 may include one or more server computers or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may include a hosted computing resource, a grid computing resource or any other distributed computing arrangement. In some cases, the computing environment 203 may correspond to an elastic computing resource where the allotted capacity of processing, network, storage, or other computing-related resources may vary over time.

The computing devices that form the computing environment 200 may be in data communication with each other via a network. The network can include wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®) BLUETOOTH® networks, microwave transmission networks, as well as other networks relying on radio broadcasts. The network can also include a combination of two or more networks. Examples of networks can include the Internet, intranets, extranets, virtual private networks (VPNs), and similar networks.

Various applications or other functionality may be executed in the computing environment 203. These components can include a hypervisor 203, one or more virtual machines 100, and a management application 206. Other applications or components may also be executed by the computing environment as required by various embodiments of the present disclosure.

The hypervisor 203 is executed to create and execute one or more virtual machines 100. The hypervisor 203 may assign various resources of the host machine that executes the hypervisor 203 to the individual virtual machines 100. For example, the hypervisor 203 can allocate a specified number of processors or processor cores to a virtual machine 100, a specified amount of RAM to a virtual machine 100, as well as other resources. In some instances, the hypervisor 203 may provide emulated hardware functionality to the virtual machine 100, such as an emulated graphics card, an emulated network adapter, virtual machine disk images 106, or other devices. In other instances, the hypervisor 203 may provide for direct access to a specified physical device by "passing through" commands from the guest operating system installed on the virtual machine 100 to the specified physical device. In some implementations, the hypervisor 203 executes directly on the hardware of the host machine to control the hardware of the host machine and manage the virtual machines executing on the host machine. In other implementations, the hypervisor 203 is an application executed by a host operating system executing on the host machine.

The management application 206 is executed to control the operation of the hypervisor 203. For example, the management application 206 can be used to configure a virtual machine 100 for execution by the hypervisor. For instances, the management application 206 can be used to assign virtual processors or processor cores, RAM, virtual machine disk images 106, or mapped devices 113 to the virtual machine 100. The management application 206 can also be used to adjust the size of virtual machine disk images 106 or mapped devices 113 assigned to the virtual machine 100. Likewise, the management application 206 can be used by a user to create snapshots or clones of virtual machine disk images 106 or mapped devices 113 or to share virtual machine disk images 106 or mapped devices 113 between multiple virtual machines 100 (e.g., in a fail-over configuration).

The management application 206 can also generate multiple reports for a user. For example, a report can include a total cost incurred or accrued for a period of time (e.g., the month to-date) based on the number of virtual machines 100 used and the type and amount of resources assigned to a virtual machine 100. As another example, a report can include an estimated cost that would be projected to be incurred for a specified period of time (e.g., a day, a week, a month, etc.). The estimated cost can be based on the number of virtual machines 100 that the user plans to use and how the virtual machines 100 are configured. For example, the amount and type of processing, memory, and storage resources provisioned for each virtual machine 100 could be used to estimate the cost. As another example, the manner in which resources are provisioned for a virtual machine 100 or a virtual machine 100 is configured can affect the estimated cost. For example, a virtual machine 100 that is provided with a read-only snapshot of a virtual machine disk image 106 or a mapped device 113 may be incur a different cost compared a virtual machine 100 with read and write access to the same virtual machine disk image 106 or mapped device 113.

The management application 206 may also be executed to track consumption of resources by a virtual machine 100 operated by a customer and invoicing the customer appropriately. For example, the management application 206 may track how much time a virtual machine 100 was operated, the amount of storage space consumed by the virtual machine 100, as well as other data. The management application 206 could then bill of invoice the customer at periodic intervals.

In some implementations, the functionality of the management application 206 may be implemented using a suite of related applications. For example, a first application could be used for configuring individual virtual machines 100 and managing their execution by the hypervisor 203. A second application could be used for generating the reports desired by a user of the virtual machines 100. A third application could be used for tracking resource consumption by the virtual machines 100 and invoicing a customer. The functionality of any application could be further subdivided among additional individual applications in various embodiments of the present disclosure.

Also, various data is stored in one or more data stores that are available to the computing environment 200. The data stores may be representative of a plurality of data stores. The data stores can be implemented using various data storage applications or structures. For example, a data store could include a logical block storage device (e.g., a SAN, an array of disks, an individual storage disk, a virtual machine disk image 106, or similar storage structure). A data store could also include data storage structures implemented on top of a logical block storage device, such as a file-system. In some instances, the data store can also include data storage applications or structures that read data or write to the underlying file-system, such as relational databases, object-oriented databases, hierarchical databases, hash tables or similar key-value data stores, as well as other data storage applications or data structures. Examples of data stores include the management data store 209, the pseudo-data store 213, and the virtual machine data store 103.

The management data store 209 is used to store data on behalf of the management application 206. For example, the management data store 209 may include one or more account records 216 for each customer or user executing virtual machines 100 within the computing environment 200. Each account record 216 may include data related to a customer's use of virtual machines 100 within the computing environment 200. For example, an account record 216 may include the LUN 116 of virtual machine disk images 106 or pseudo-data stores 213 for mapped disks 113 in use by a customer. The account record 216 may also include one or more virtual machine records 219. Each virtual machine record 219 can represent a virtual machine 100 configured and used by the customer. For example, a virtual machine record 219 may include references to the number of processors or processors cores assigned to a virtual machine 100, the operating system installed on the virtual machine 100, the amount of RAM assigned to the virtual machine 100, the number and type of graphics processing units (GPUs) assigned to the virtual machine 100, and other configuration information.

Each virtual machine record 219 may also include a virtual machine usage rate 223 for the virtual machine 100. The virtual machine usage rate 223 can represent the cost per period of time (e.g., cost per hour, cost per minute, cost per second, or fractions thereof) that a customer will be charged for usage of the virtual machine 100. The virtual machine usage rate 223 may reflect the amount of resources assigned to the virtual machine 100 when it is executed, licensing costs associated with software installed on the virtual machine 100, whether or not usage has been paid for in advance, and other factors. In some instances, the virtual machine usage rate 223 may change over time (e.g., due to price increases passed on to users by a hosting provider).

The pseudo-data store 213 is used as a mechanism to track the cost of storage for a mapped device 113 by a virtual machine 100. As the mapping file 109 and the mapped device 113 may be located on separate data stores, the characteristics of the mapped device 113 may differ from those of the mapping file 109. For example, the cost charged for reading from or writing to the data store hosting the mapped device 113 may differ from the cost of reading from or writing to the virtual machine data store 103 that hosts the mapping file 109. As another example, the cost of storing data may differ between data stores. For instance, a first data store may charge a higher price per megabyte or gigabyte of storage than a second data store because the first data store may be backed by higher-bandwidth or lower-latency drives than the second data store.

Accordingly, various information may be stored in the pseudo-data store 213. For example, the pseudo-data store 213 may include the LUN 116 of the mapped device 113 to be associated with the pseudo-data store 213. The pseudo-data store 213 may also include a data usage rate 226 for storage on the mapped device 113 identified by the LUN 116. The data usage rage 226 may represent a price per unit of storage for a given period of time. For example, the usage rate 226 could specify a cost per gigabyte of storage consumed per month, a cost per gigabyte of storage consumed per day, or a similar metric. In some instances, the data usage rate 226 may change over time (e.g., due to price increases passed on to users by a hosting provider). Also, a mode type 229 may be stored in the pseudo-data store 213 to record whether the corresponding mapped device 113 is in virtual mode or physical mode, as previously discussed.

Each virtual machine data store 103 may also include a data usage rate 226. The data usage rate 226 assigned to the virtual machine data store 103 may be applied to each virtual machine disk image 106 stored by the virtual machine data store 103. As virtual machine disk images 106 are cloned, snapshotted, created, or deleted, a customer will be charged for the storage of these virtual machine disk, images 106 on the virtual machine data store 103. In some instances, the data usage rate 226 may change over time (e.g., due to price increases passed on to users by a hosting provider).

Next, a general description of the operation of the various components of the computing environment 200 is provided. To begin, one or more virtual machines 100 are created using the management application 206. Each virtual machine 100 may be assigned one or more storage devices, represented by a virtual machine disk image 106 or a mapped device 113 presented to the virtual machine 100 as an RDM disk using a mapping file 109. Each virtual machine 100 may also be configured to execute in a particular manner. For example, some virtual machines 100 may be configured to execute, while others may be kept idle or suspended. The idle or suspended virtual machine 100 may be configured to begin execution if a first virtual machine 100 stops operating.

For example, the first virtual machine 100 may be configured to begin operation as a "fail over" or "hot spare" in the event that a second virtual machine 100 ceases operation (e.g., due to a software bug, configuration error, or other issue). To facilitate the transition, the LUNs 116 of the logical disks assigned to one virtual machine 100 may also be assigned to another virtual machine 100. To maintain state, one virtual machine 100 may be provided read and write access to a logical disk, while the "hot spare" or "fail over" virtual machine 100 may be provided read-only access. As another example, the logical disk (e.g., virtual machine disk image 106 or mapped device 113) assigned to a first virtual machine 100 may be cloned and assigned to the "hot spare" or "fail over" virtual machine 100 when the first virtual machine 100 goes offline. In a third example, periodic snapshots of the logical disk may be taken and assigned to the "hot spare" or "fail over" virtual machine 100. This configuration can allow for the "hot spare" or "fail over" virtual machine 100 to use an earlier version of the logical disk prior, which is more likely to have a viable state compared to the current state of the logical disk of the first virtual machine. For instance, if a change to a configuration file were made at 12:05 p.m. Eastern Daylight Time (EDT), the "hot spare" or "fail over" virtual machine could use a snapshot of a logical disk created prior to 12:04 p.m. EDT in order to continue execution.

If a mapped device 113 is assigned to a virtual machine 100 as an RDM disk, a corresponding pseudo-data store 213 is created for the mapped device 113. The pseudo-data store 213 can be assigned the LUN 116 of the mapped device 113, a data usage rate 226 reflecting the cost to use the underlying resources that provide the mapped device 113, and a mode type 229 for communicating with the mapped device 113. The management application 206 can later determine how much storage space is consumed by the virtual machine(s) 100 to which the mapped device 113 has been assigned as an RDM device by referencing the pseudo-data store 213, obtaining the LUN 116, and querying the mapped device 113 identified by the LUN 116 for a status of the current amount of storage consumed.

The management application 206 can then calculate the current cost for the storage consumed by a virtual machine 100 using various formulas. For example, the storage costs associated with a virtual machine may use different formulas that take into account different factors depending on whether a mapped device 113 assigned to the virtual machine 100 is operating in physical mode or virtual mode. These costs can then be used to create an invoice, generate a report for a client estimating future costs associated with the virtual machine 100, or for other purposes.

For example, the storage cost of a virtual machine 100 that has a mapped device 113 assigned to it that is operating in physical mode may be calculated using the following formula set forth in equation (1):

Storage Cost$_{VM(with\ Physical\ Mode\ RDMs)}=$ $\Sigma$(SizeOf(Shared Disk)*Data Usage Rate)+

$\Sigma$(SizeOf(Mapped Device)*Data Usage Rate)+

$\Sigma$(SizeOf(Non-Shared Disk)*Data Usage Rate)  (1)

As illustrated by equation (1), the cost of storage consumed by a virtual machine 100 at any given point in time is the sum of the size of all shared disks assigned to the virtual machine 100 (e.g., cloned virtual machine disk images 106 or snapshots of virtual machine disk images 106) multiplied by a data usage rage 226 added to the sum of the size of all RDM disks assigned to the virtual machine 100 (e.g., the size of all mapped devices 113) multiplied by a data usage rage added to the sum of all other non-shared disks (e.g., virtual machine disk images 100 assigned only to the virtual machine 100). While equation (1) calculates the storage cost for the virtual machine 100 at any given point in time, it does not calculate the amount of storage consumed over a period of time, which may change as logical disks such as mapped devices 113 or virtual machine image files 106 are added to or removed from the virtual machine 100. Accordingly, equation (1) may be integrated with respect to time to calculate the cost of storage for a period of time, as illustrated by the following formula set forth in equation (2):

$$\text{Storage Cost}_{VM(With\ Physical\ Mode\ RDMs)} = \int_0^t (\sum (SizeOf(\text{Shared Disk}, t) * \text{Data Usage Rate}(t)) \\ + \sum (SizeOf(\text{Mapped Device}, t) * \text{Data Usage Rate}(t)) \\ + \sum (SizeOf(\text{Non-Shared Disk}, t) * \text{Data Usage Rate}(t)))dt \quad (2)$$

However, this formula can be modified to take into account various cost strategies or policies.

For example, a virtual machine 100 may be assigned a mapped device 113, but the virtual machine 100 may be configured to operate as a "fail-over." A fail-over virtual machine 100 may not be executing until a currently active virtual machine 100 ceases operation (e.g., a data center hosting the currently active virtual machine 100 goes offline). At that point, the fail-over virtual machine 100 may begin executing and begin to use the storage of the mapped device 113. Accordingly, some cost strategies may choose to charge for the cost of tracking the assignment of the mapped device 113 to the fail-over virtual machine 100. However, a different charge may be applied until and unless the fail-over virtual machine 100 begins executing. In such situation, equations (1) and (2) may be modified to take this factor into account. An example for how the costs for mapped devices 113 assigned to fail-over virtual machines 100 may be taken into account is provided in equation (3):

$$\text{Storage Cost}_{VM(With\ Physical\ Mode\ RDMs)} = \int_0^t (\sum (SizeOf(\text{Shared Disk}, t) * \text{Data Usage Rate}(t)) \\ + \sum (SizeOf(\text{Mapped Device}, t) * \text{Data Usage Rate}(t)) \\ + \sum (SizeOf(\text{Non-Shared Disk}, t) * \text{Data Usage Rate}(t)) \\ + Cost_{fail-over}(t))dt \quad (3)$$

However, the fixed cost represented by the variable Cost$_{fail-over}$(t) can be replaced with a formula representing the actual cost of the fail-over virtual machine 100 in those implementations where the service provided by fail-over virtual machine 100 is only charged when it is actually in use (e.g., when a fail-over virtual machine 100 begins execution in response to a failure or suspension of the currently active virtual machine 100).

However, when the virtual machine 100 has a mapped device 113 assigned to it that is operating in virtual mode, additional factors (e.g., snapshots, clones, templates, etc.)

may need to be considered when calculating the cost for the virtual machine 100. For instance, when the virtual machine 100 has a mapped device 113 assigned to it in virtual mode, but no snapshots, clones, or templates have been created from the mapped device 113, then the cost for a virtual machine 100 with a mapped device 113 in virtual mode is the same as the cost for a virtual machine with a mapped device 113 in physical mode. However, when clones or snapshots have been created from the mapped device 113 operating in virtual mode, the additional storage consumed by the clones or snapshots may be taken into account using the formula provided by equation (4):

Storage Cost$_{VM(With\ Virtual\ Mode\ RDMs)}$=

$\Sigma$(SizeOf(Mapped Device)*Data Usage Rate)+

$\Sigma$(SizeOf(Snapshots or Clones of Mapped Device)
 *Data Usage Rate)+

$\Sigma$(SizeOf(Shared Clones or Snapshots)*Data Usage Rate)+

$\Sigma$(SizeOf(Non-Shared Disk)*Data Usage Rate)+

$\Sigma$(SizeOf(Mapping File)*Data Usage Rate)  (4)

As illustrated by equation (4), the cost of storage consumed by a virtual machine 100 at any given point in time is the sum of the size of all shared disks assigned to the virtual machine 100 (e.g., cloned virtual machine disk images 106 or snapshots of virtual machine disk images 106) multiplied by a data usage rage 226 added to the sum of the size of all RDM disks assigned to the virtual machine 100 (e.g., the size of all mapped devices 113) multiplied by a data usage rage added to the sum of all other non-shared disks (e.g., virtual machine disk images 100 assigned only to the virtual machine 100) added to the sum of the size of all snapshots or clones of the mapped device 119 multiplied by a data usage rate 226 added to the size of the mapping file 109 for each mapped device 119 assigned to the virtual machine 100 multiplied by a data usage rate 226. While equation (4) calculates the storage cost for the virtual machine 100 at any given point in time, it does not calculate the amount of storage consumed over a period of time, which may change as logical disks such as mapped devices 113 or virtual machine image files 106 are added to or removed from the virtual machine 100. Accordingly, equation (4) may be integrated with respect to time to calculate the cost of storage for a period of time, as illustrated by the following formula set forth in equation (5):

$$\text{Storage Cost}_{VM(With\ Virtual\ Mode\ RDMs)} = \int_0^t (\sum (SizeOf(\text{Mapped Device}, t) * \text{Data Usage Rate}(t)) \\ + \sum (SizeOf(\text{Snapshots or Clones of Mapped Device}, t) * \text{Data Usage Rate}(t)) \\ + \sum (SizeOf(\text{Shared Clones or Snapshots}, t) * \text{Data Usage Rate}(t)) \\ + \sum (SizeOf(\text{Non-Shared Disk}, t) * \text{Data Usage Rate}(t))dt \\ + \sum (SizeOf(\text{Mapping File}) * \text{Data Usage Rate}(t)))dt$$

(5)

However, this formula can be modified to take into account various cost strategies or policies.

For example, the cost associated with the mapping file 109 may be omitted from the calculation of costs. Although there is a storage cost incurred in maintaining the mapping file 109 in order to provide the mapped device 113 to a customer virtual machine 100, the size of the mapping file 109 is often small relative to the size of the mapped device 113. Moreover, the size of the mapping file 109 may not be readily apparent to the customer. Accordingly, the mapping file 109 may be omitted from the cost calculation in order to avoid a mismatch between the customer's expected costs and the calculated costs.

As another example, a mapped device 113 in virtual mode may be shared among multiple devices. While the formulas provided in equation (4) and (5) assume that a virtual machine 100 is be charged for the entire cost of each mapped device 113 or snapshot or clone of a mapped device 113 assigned to the virtual machine 100, the cost can be split across a number of virtual machines 100. For example, if five virtual machines 100 were sharing the same mapped device 113, the cost of the storage associated with the mapped device could be split across the five virtual machines 100 such that the cost of one-fifth (⅕) of the mapped device 113 would be assigned to each virtual machine 100. This allows for the cost associated with the mapped device 113 to be allocated across multiple virtual machines 100 that are using the mapped device 113. To calculate the costs in this approach, the formula of equation (4) could be modified as reflected below in equation (6):

$$\text{Storage Cost}_{VM(With\ Virtual\ Mode\ RDMs)} = \qquad (6)$$
$$\sum \left(\left(\frac{SizeOf(\text{Mapped Device})}{NUMVM}\right) * \text{Data Usage Rate}\right) +$$
$$\sum \left(\left(\frac{SizeOf(\text{Snaphots or Clones of Mapped Device})}{NUMVM}\right) * \text{Data Usage Rate}\right) +$$
$$\sum (SizeOf(\text{Shared Clones or Snapshots}) * \text{Data Usage Rate}) +$$
$$\sum (SizeOf(\text{Non-Shared Disk}) * \text{Data Usage Rate}) +$$
$$\sum (SizeOf(\text{Mapping File}) * \text{Data Usage Rate})$$

As an example, the principles embodied by equations (1)-(6) could be used to calculate the costs incurred from the operation of one or more virtual machines 100 that have been assigned mapped devices 113. At periodic intervals (e.g., every week, every month, or every quarter), the management application 206 could determine the amount of storage consumed by each virtual machine 100 of a customer by querying the appropriate virtual machine data store 103 or pseudo-data store 213 associated with each LUN 116 stored in an account record 216 to determine the amount of storage consumed by a particular virtual machine 100 assigned to a customer and the corresponding data usage rate 226. The management application 206 could then calculate the amount owed by the customer according to one or more of the various approaches discussed above.

As another example, the principles embodied by equations (1)-(6) could be used to estimate or anticipate the costs that would be incurred by a customer. For instance, the customer could configure various virtual machines 100 through the management application 206. As part of the configuration, the customer could assigned one or more mapped devices 113 to a virtual machine 100, one or more virtual machine disk images 106, and other resources. For example, the customer could assign a mapped device 113 in physical mode, several snapshots of a mapped device 113 in virtual mode, and one or more virtual machine disk images 106 to a virtual machine 100. The customer could also input data related to the consumption of the assigned resources, such as an estimated amount of storage to be used by each assigned disk. The customer could then execute the management application 206 to estimate the cost to execute the configured virtual machine 100 for a specified period of time.

Figure 3:
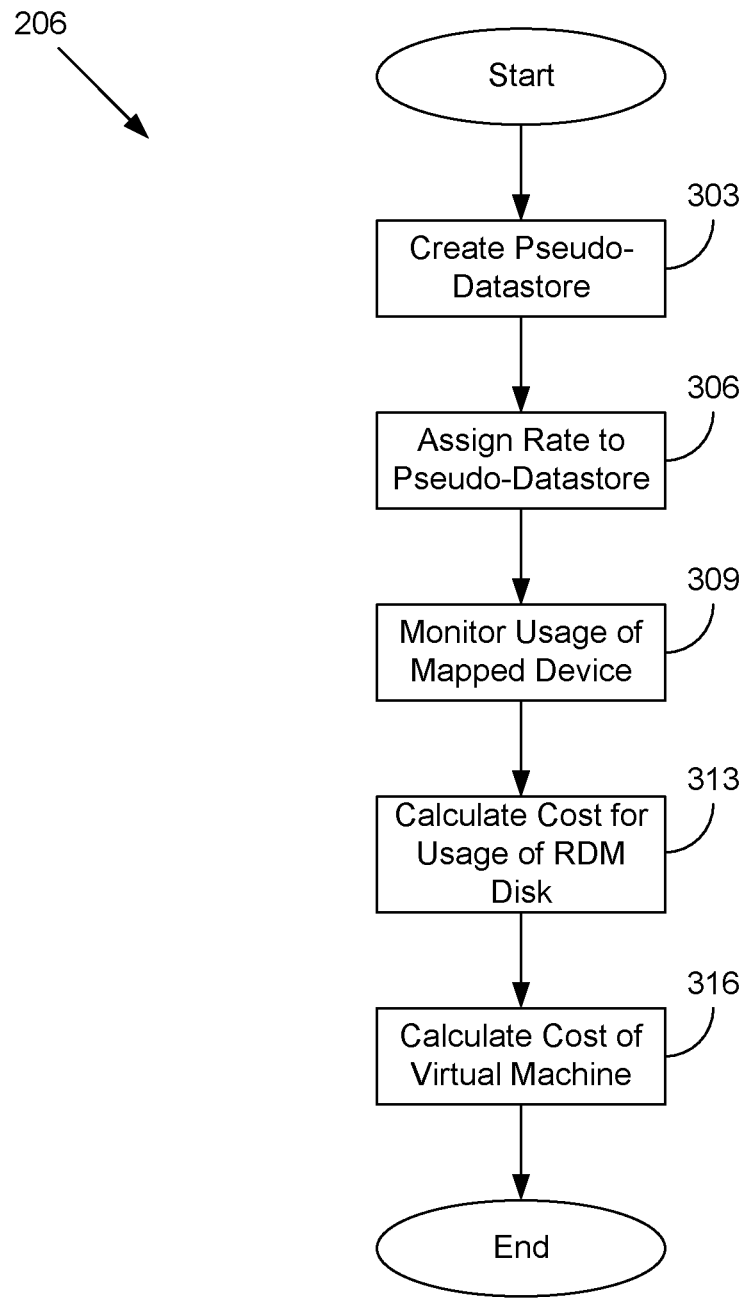
FIG. 3 is a flowchart illustrating one example of functionality implemented as portions of an application executed in a computing environment in the networked environment of FIG. 2 according to various embodiments of the present disclosure.

Referring next to FIG. 3, shown is a flowchart that provides one example of the operation of a portion of the management application 206 according to various embodiments. It is understood that the flowchart of FIG. 3 provides merely an example of the many different types of functional arrangements that may be employed to implement the operation of the portion of the management application 206 as described herein. As an alternative, the flowchart of FIG. 3 may be viewed as depicting an example of elements of a method implemented in the computing environment 200 according to one or more embodiments.

Beginning at step 303, the management application creates a pseudo-data store 213 in response to a mapped device 113 being assigned to a virtual machine 100. A LUN 116 of the mapped device 116 is stored in the pseudo-data store 213 to associate the pseudo-data store 213 with the mapped device 113. The mode type of mapped device 113 (e.g., physical mode or virtual mode) is also stored in the pseudo-data store 213.

Moving on to step 306, the management application 206 can assign a data usage rate 226 to the pseudo-data store 213. The data usage rate 226 may be selected based on the type of storage underlying the mapped device 113. For example, arrays of solid state disks may have one data usage rate 226 while arrays of hard disk drives may have another data usage rate 226 that reflects differences in size, bandwidth, and latency for the types of drives.

Proceeding next to step 309, the management application 206 monitors usage of the mapped device 113 over a predefined period of time, such as an amount of time equal to one billing cycle (e.g., a week, a month, a quarter, etc.). For example, the management application 206 may query the pseudo-data store 213 to retrieve the LUN 116 of the underlying mapped device 113. The management application 206 could then regularly query the mapped device 113 to determine the amount of storage space currently consumed on the mapped device 113. Usage of the mapped device 113 could be integrated over time to calculate the amount of storage consumed on the mapped device 113 for a given period of time.

At step 313, the management application 206 calculates the cost for the storage used by the virtual machine 100 on the mapped device 113. In some instances, the management application 206 may also calculate the cost for storage used by the virtual machine 100 on other storage devices, such as virtual machine disk images 106 assigned to the virtual machine 100. Depending on the mode type 229 of the mapped devices 113 assigned to a virtual machine 100 and the cost strategy to be used, the management application 206 could use one or more of the formulas represented by equations (1)-(6) to calculate the cost of the storage consumed by the virtual machine 100.

Moving to step 316, the management application 206 calculates the cost accrued or incurred by the virtual machine 100. This can be based on the cost of the storage used by the virtual machine 100, as previously calculated at step 313. The management application 206 could also include costs related to other factors, such as the amount of processing power used by the virtual machine 100, the amount of RAM allocated to the virtual machine 100, the amount of bandwidth consumed by the virtual machine 100, or other factors.

Although the hypervisor 203 and the management application 206, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the management application 206. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code through various processes. For example, the machine code may be generated from the source code with a compiler prior to execution of the corresponding application. As another example, the machine code may be generated from the source code concurrently with execution with an interpreter. Other approaches can also be used. If embodied in hardware, each block may represent a circuit or a number of interconnected circuits to implement the specified logical function or functions.

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the hypervisor 203 and the management application 206, that includes software or code can be embodied in any non-transitory computer-readable medium for use by or in connection with an instruction execution system such as, for example, a processor in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the hypervisor 203 and the management application 206, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device or in multiple computing devices in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A system for calculating costs of virtual machines using raw-device mapped (RDM) disks, comprising:
   a computing device comprising a processor and a memory; and
   machine readable instructions stored in the memory that, when executed by the processor, cause the computing device to at least;
      create a pseudo-datastore, the pseudo-datastore representing an RDM disk comprising a mapping file that exposes direct access to a disk identified by a logical unit number (LUN);
      assign a unit rate to the pseudo-datastore, the unit rate representing a cost per unit of storage provided by the RDM disk;
      monitor usage of the RDM disk; and
      calculate a cost for the usage of the RDM disk for a period of time based on the unit rate assigned to the pseudo-datastore.

2. The system of claim 1, wherein the RDM disk is assigned to a virtual machine, and the machine readable instructions further cause the computing device to at least calculate a total cost for usage of the virtual machine for the period of time based on the calculated cost for the usage of the RDM disk.

3. The system of claim 2, wherein the machine readable instructions further cause the computing device to at least:
   determine that a snapshot of the RDM disk has been created and assigned to a clone of the virtual machine; and
   calculate an additional cost for usage of the clone of the virtual machine based on a size of the snapshot of the RDM.

4. The system of claim 2, wherein the machine readable instructions that cause the computing device to calculate the total cost for the usage of the virtual machine for the period of time based on the calculated cost for the usage of the RDM disk further cause the computing device to at least integrate the usage of the RDM disk with respect to the period of time.

5. The system of claim 1, wherein the machine readable instructions further cause the computing device to at least receive the unit rate from a client device in data communication with the computing device.

6. The system of claim 1, wherein the mapping file is stored on a separate disk identified by a separate LUN.

7. The system of claim 6, wherein the separate disk that stores the mapping file has a separate unit rate that represents a separate cost per unit of storage provided by the separate disk.

8. A method for calculating costs of virtual machines using raw-device mapped (RDM) disks, comprising:
   creating a pseudo-datastore, the pseudo-datastore representing a raw-device mapping (RDM) disk comprising a mapping file that exposes direct access to a disk identified by a logical unit number (LUN);
   assigning a unit rate to the pseudo-datastore, the unit rate representing a cost per unit of storage provided by the RDM disk;
   monitoring usage of the RDM disk; and
   calculating a cost for the usage of the RDM disk for a period of time based on the unit rate assigned to the pseudo-datastore.

9. The method of claim 8, wherein the RDM disk is assigned to a virtual machine, and the method further comprises calculating a total cost for usage of the virtual machine for the period of time based on the calculated cost for the usage of the RDM disk.

10. The method of claim 9, wherein calculating a total cost for usage of the virtual machine for the period of time based on the calculated cost for the usage of the RDM disk further comprises integrating the usage of the RDM disk with respect to the period of time.

11. The method of claim 9, further comprising:
determining that a snapshot of the RDM disk has been created and assigned to a clone of the virtual machine; and
calculating an additional cost for usage of the clone of the virtual machine based on a size of the snapshot of the RDM.

12. The method of claim 8, further comprising receiving the unit rate from a client device in data communication with the computing device.

13. The method of claim 8, wherein the mapping file is stored on a separate disk identified by a separate LUN.

14. The method of claim 13, wherein the separate disk that stores the mapping file has a separate unit rate that represents a separate cost per unit of storage provided by the separate disk.

15. A non-transitory computer-readable medium, comprising machine readable instructions for calculating costs of virtual machines using raw-device mapped (RDM) disks that, when executed by a processor of a computing device, cause the computing device to at least:
create a pseudo-datastore, the pseudo-datastore representing an RDM disk comprising a mapping file that exposes direct access to a disk identified by a logical unit number (LUN);
assign a unit rate to the pseudo-datastore, the unit rate representing a cost per unit of storage provided by the RDM disk;
monitor usage of the RDM disk; and
calculate a cost for the usage of the RDM disk for a period of time based on the unit rate assigned to the pseudo-datastore.

16. The non-transitory computer-readable medium of claim 15, wherein the RDM disk is assigned to a virtual machine, and the machine readable instructions further cause the computing device to at least calculate a total cost for usage of the virtual machine for the period of time based on the calculated cost for the usage of the RDM disk.

17. The non-transitory computer-readable medium of claim 16, wherein the machine readable instructions further cause the computing device to at least:
determine that a snapshot of the RDM disk has been created and assigned to a clone of the virtual machine; and
calculate an additional cost for usage of the clone of the virtual machine based on a size of the snapshot of the RDM.

18. The system non-transitory computer-readable medium of claim 16, wherein the machine readable instructions that cause the computing device to calculate the total cost for the usage of the virtual machine for the period of time based on the calculated cost for the usage of the RDM disk further cause the computing device to at least integrate the usage of the RDM disk with respect to the period of time.

19. The non-transitory computer-readable medium of claim 15, wherein the machine readable instructions further cause the computing device to at least receive the unit rate from a client device in data communication with the computing device.

20. The non-transitory computer-readable medium of claim 15, wherein the mapping file is stored on a separate disk identified by a separate LUN and the separate disk that stores the mapping file has a separate unit rate that represents a separate cost per unit of storage provided by the separate disk.

* * * * *